Jan. 28, 1969  J. STEINBERGER ETAL  3,424,468

POWER-OPERABLE MULTIJAW CHUCK

Filed Nov. 9, 1966

United States Patent Office
3,424,468
Patented Jan. 28, 1969

3,424,468
POWER-OPERABLE MULTIJAW CHUCK
Josef Steinberger, Dusseldorf, and Heinz Beckers, Dulken, Germany, assignors to Paul Forkardt K.G., Dusseldorf, Germany
Filed Nov. 9, 1966, Ser. No. 593,117
Claims priority, application Germany, Nov. 11, 1965,
F 47,656
U.S. Cl. 279—121  4 Claims
Int. Cl. B23b 31/16

ABSTRACT OF THE DISCLOSURE

A chuck having radially reciprocapable jaws actuated by on axially movable wedge member. Each jaw has a forwardly projecting protuberance positioned within a recess in the chuck front cover plate so that the protuberance will engage the ends of the recess to prevent the jaws from flying out of the chuck body in the event of breakage of either of the cooperating jaw or wedge member portions employed for actuating the jaws.

---

The present invention relates to a power operable multijaw chuck the jaws of which are actuated by the axial movement of a wedge member. Experience has shown that heretofore chucks have caused accidents when in view of an overload on the chuck the latter breaks so that the jaws will fly out of the chuck.

It is, therefore, an object of the present invention to provide a power-operable multijaw chuck, which will overcome the above mentioned drawback.

It is another object of this invention to provide a power operable multijaw chuck which in case of accident will limit the stroke of the jaws in inward and outward direction.

These and other objects and advantages of the invention will appear more clearly from the following specification in connection with the accompanying drawing, in which.

Figure 1A:
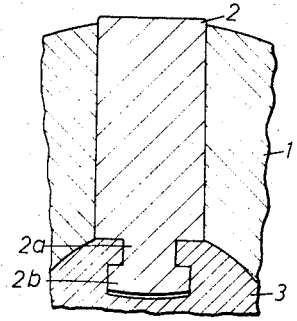
FIG. 1a illustrates a partial sectional view of the jaw structure taken along line 1a and FIG. 1.
Figure 1:
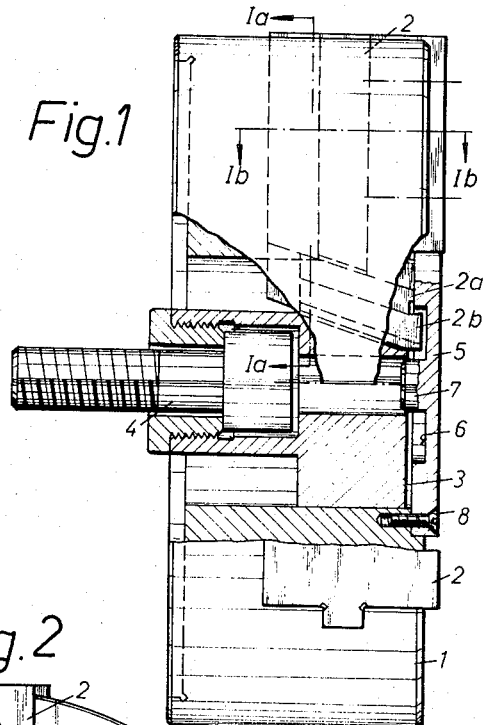
FIG. 1 illustrates a side view, partly in section, of a chuck according to the invention.

The power operable chuck according to the invention, the jaws of which are adjustable by the axial movement of a wedge member, is characterized primarily in that the inside of the closing plate or closing ring is provided with a recess engaged by a protrusion at the front side of the inner end of each jaw. This interengagement of the jaws and the cover plate does not affect the normal adjusting possibility of the jaws but prevents an undue movement of the jaws toward the outside, for instance in case of a break due to overload in the power transmission.

This cover plate may be provided with a central pivot or collar against which the inner ends of the jaws will abut at the end of their permissible radial stroke. The arrangement according to the invention also prevents too far a movement of the jaws and the chuck wedge member when the driving element, for instance the compressed air operable cylinder, has a stroke which is greater than the stroke of the chuck wedge member and also when the chuck wedge member is not provided with an abutment.

According to a modification of the present invention, the central pivot is designed in the form of a roller journalled with play. Such an arrangement compensates for unavoidable tolerances of the jaws in longitudinal direction which tolerances could bring about that the jaws do not engage the central pivot simultaneously.

Referring now to the drawing in detail, the chuck body 1 is provided for instance with three jaws 2 which have hook-shaped ends 2a. These hook-shaped ends 2a are engaged in a manner known per se by a correspondingly designed wedge member 3 which is equipped with a screw 4 for connection with a pullrod (not shown) adapted to be reciprocated for instance by a pneumatic air cylinder piston system. In order to prevent the jaws 2 from flying outwardly if for instance a jaw or wedge member 3 breaks, the closing cover or cover plate 5 of the chuck body 1 is at its inside provided with a recess 6 into which extends a protrusion 2b of the inner end of each jaw 2. In this way, an undue movement of the jaws toward the outside will be prevented.

The cover plate 5 has its inner side provided with a central stud or pivot 7 against which the ends of the jaws abut at the end of their permissible radial stroke so that also too far a movement of the jaws 2 in inward direction and too far a movement of the piston 3 toward the left will be prevented.

Figure 3:
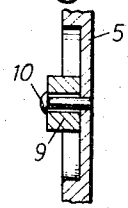
FIG. 3 shows a modification of the central stud used in connection with the chuck according to the invention.

When the jaws have tolerances, they will not abut against the central stud at one and the same time. That jaw which first abuts the stud or pivot 7 will, therefore, bend stud 7 or cover plate 7 more or less and might under certain circumstances exert thereupon a considerably higher force than the other jaws. In order to prevent such a situation, according to FIG. 3, the central stud 7 is designed as a roller journalled with play on a support, as for instance a pin 10. When the jaws have tolerances, the roller 9 will displace itself correspondingly on said pin 10.

Cover plate 5 may be connected to the chuck body for instance by screws 8.

It is, of course, to be understood that the present invention is, by no means, limited to the particular embodiments illustrated in the drawing but also comprises any modifications within the scope of the appended claims. Thus, the same safety device as set forth above could also be employed in connection with chucks having a hollow spindle. In such an instance, the cover 5 would be replaced by a closure ring, and the central stud would be designed as collar.

Figure 1B:
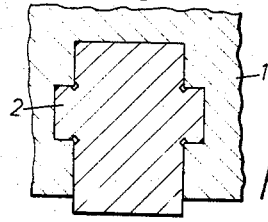
FIG. 1b illustrates a partial sectional view of the jaw structure taken along line 1b of FIG. 1.
Figure 2:
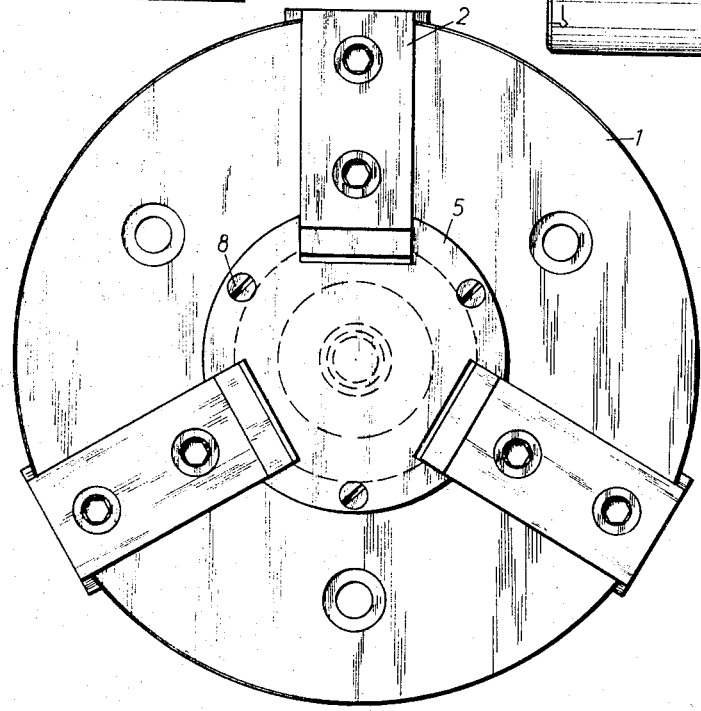
FIG. 2 is a front view of the chuck shown in FIG. 1.

The radial movement of the jaws 2 happens in a manner already known by an axial movement of the wedge member 3 as illustrated in FIGS. 1a and 1b. The wedge member 3 has grooves which are arranged in an acute angle to the axis of the wedge member 3. The ends of the jaws 2 engage in these grooves. These ends are hook-shaped or as illustrated hammer bolt-shaped. The jaws 2 are carried only radially movable in the chuck body 1. Thus, the jaws 2 are moved inwards or outwards by axial movement of the wedge member 3.

What we claim is:

1. A power operable chuck, which includes: a plurality of radially movable jaws, a member operatively connected to said jaws and movable in axial direction of said chuck for radially adjusting said jaws, the radially inner ends of said jaws respectively being provided with protruding means extending in the direction toward the front side of said chuck, and retaining means arranged at the front side of said chuck and including recess means engaged by said protruding means and providing a limited radial path of movement for said protruding means and thereby for said jaws.

2. A chuck according to claim 1, in which said retaining means is formed by a cover plate connected to the front side of said chuck and having its inwardly facing side provided with abutment means substantially coaxially arranged with regard to said chuck for abutment with said jaws at their permissible radially innermost position.

3. A chuck according to claim 2, in which said abutment means is formed by a stud.

4. A chuck according to claim 2, which includes pin means supported by said cover plate and mounted in substantially coaxial arrangement with said chuck and extending toward the interior of said chuck, and roller means mounted with play on said pin means and forming said abutment means.

References Cited

UNITED STATES PATENTS 2,948,540  8/1960  Garberding _____ 279—121 X
3,142,492  7/1964  Multer _____ 279—123

ROBERT C. RIORDON, *Primary Examiner.*

D. R. MELTON, *Assistant Examiner.*

U.S. Cl. X.R.

279—123